C. E. BEDELL.
ELECTRICAL CONTROLLER.
APPLICATION FILED JAN. 5, 1907.

969,515.

Patented Sept. 6, 1910.
5 SHEETS—SHEET 1.

WITNESSES:
C. L. Belcher
Otto J. Schaier

INVENTOR
Carl E. Bedell
BY
Wesley G. Carr
ATTORNEY

C. E. BEDELL.
ELECTRICAL CONTROLLER.
APPLICATION FILED JAN. 5, 1907.

969,515.

Patented Sept. 6, 1910.
5 SHEETS—SHEET 3.

WITNESSES:
C. L. Belcher
Otto S. Schairer

INVENTOR
Carl E. Bedell
BY
Wiley G. Carr
ATTORNEY

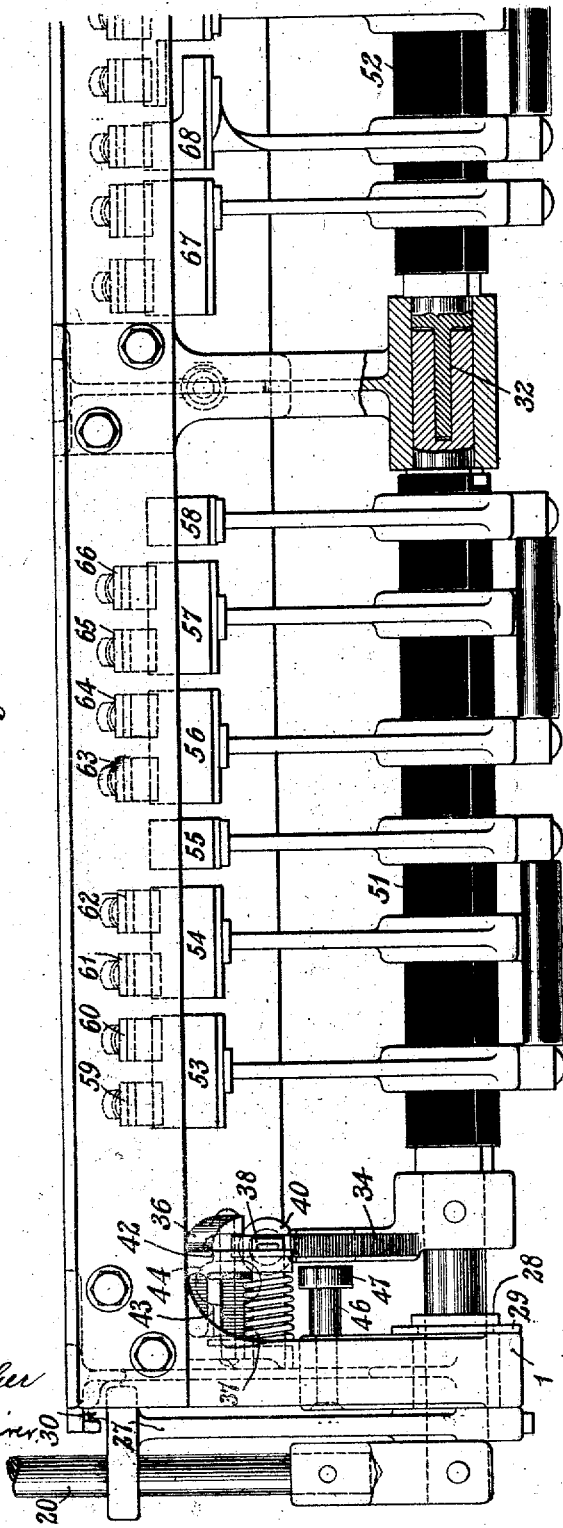

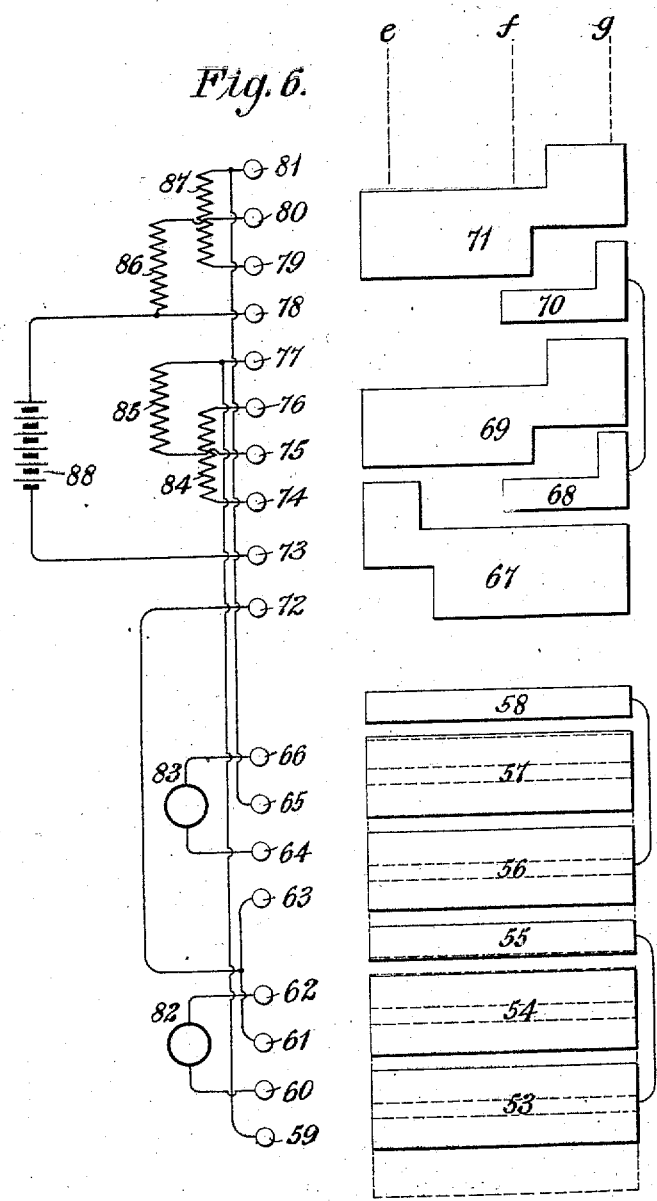

UNITED STATES PATENT OFFICE.

CARL E. BEDELL, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRICAL CONTROLLER.

969,515.  Specification of Letters Patent.  Patented Sept. 6, 1910.

Application filed January 5, 1907. Serial No. 350,958.

*To all whom it may concern:*

Be it known that I, CARL E. BEDELL, a citizen of the United States, and a resident of Wilkinsburg, in the county of Allegheny and State of Pennsylvania, have invented a new and useful Improvement in Electrical Controllers, of which the following is a specification.

My invention relates to controllers for electric motors, and particularly to those that are employed in the control of propelling motors of automobiles and similar vehicles.

The object of my invention is to provide a controller that shall be simple in construction and operation and that shall embody means whereby unintentional or accidental reversal of the connections may be prevented.

In the controllers that have heretofore been provided for the control of vehicle motors, the operating handles have frequently been movable in opposite directions from the initial or "off" position for forward and backward operation, respectively. Such controllers, however, have been quite unsatisfactory in service because movement of the operating handle through or beyond its initial or "off" position is often effected accidentally when it is only intended to return it to its "off" position, and thus the motor connections may become reversed while the motors are still revolving at considerable speed in the original and non-corresponding direction. The motors may thereby become damaged and the vehicle may be stopped more quickly than is desired or its direction of movement may even be reversed. Others have devised means for rendering it difficult or impossible to accidentally or unintentionally move the controller handle through the "off" position, but such means have generally been inconvenient to operate and otherwise unsatisfactory in service.

According to the present invention, the controller handle is movable from the initial or "off" position, for both forward and reverse directions of rotation of the motors, though in different planes and, if the handle is moved beyond the "off" position, it only effects application of the brakes, a result that is generally desirable.

Figure 1:
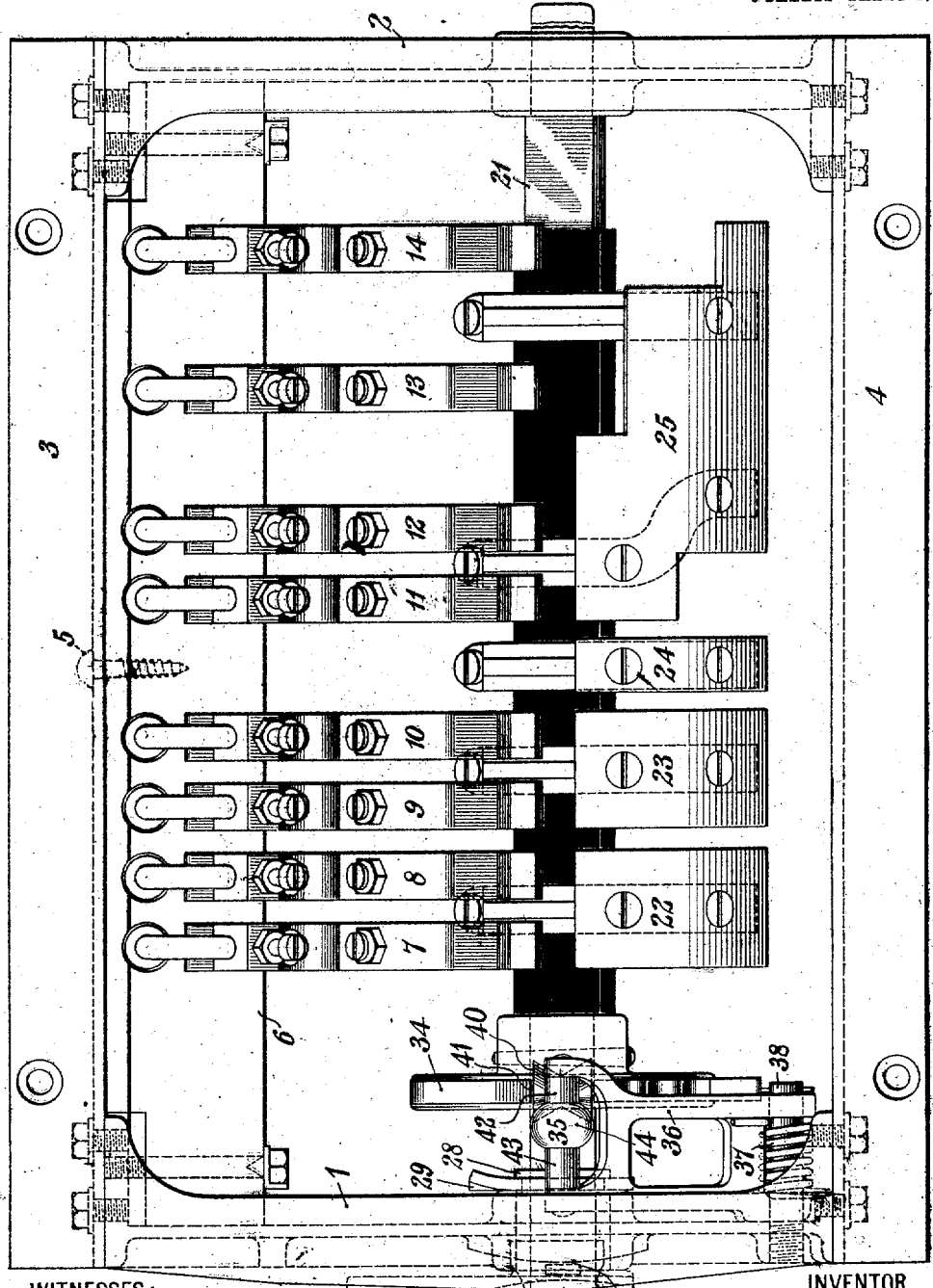
Figure 2:
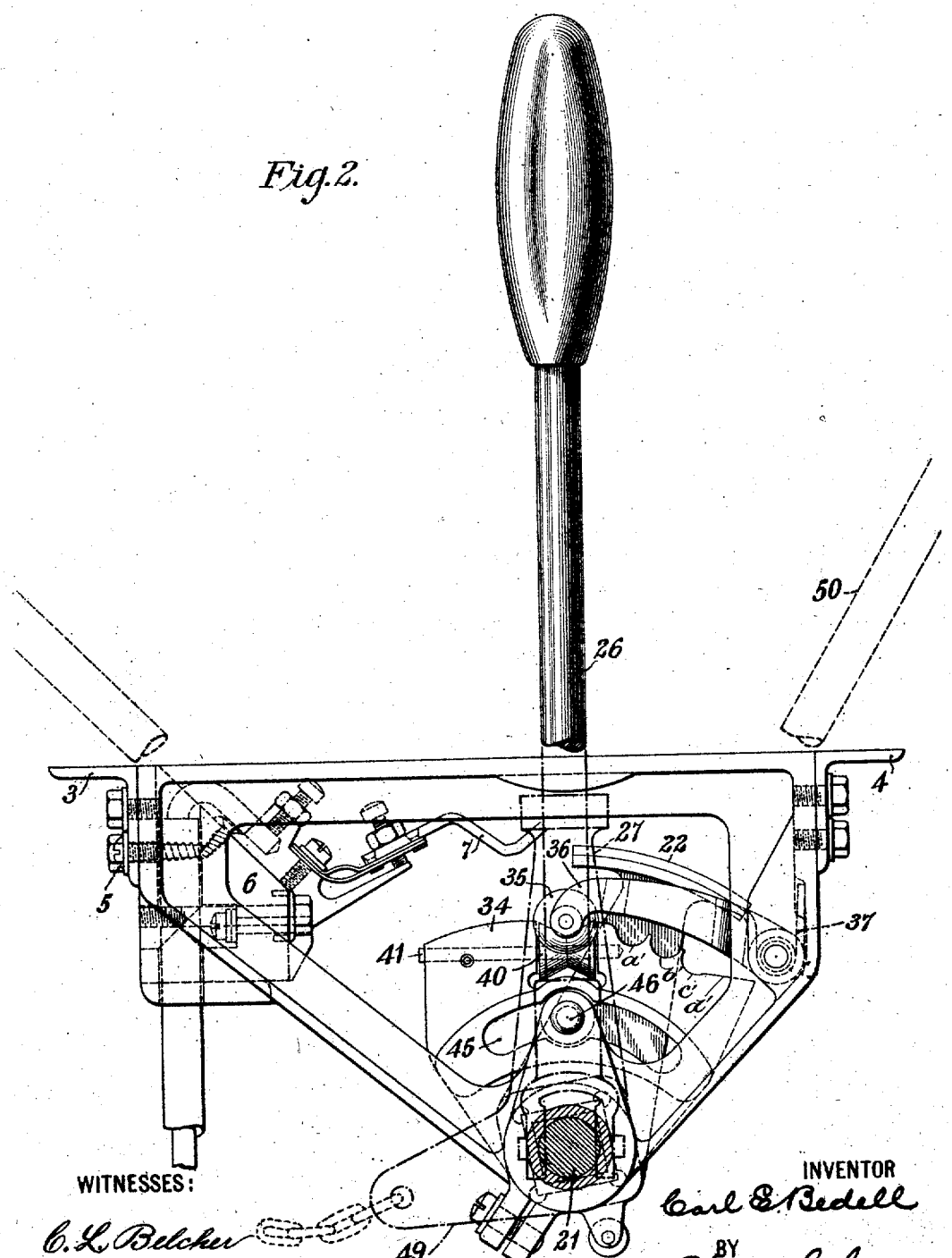
Figure 3:
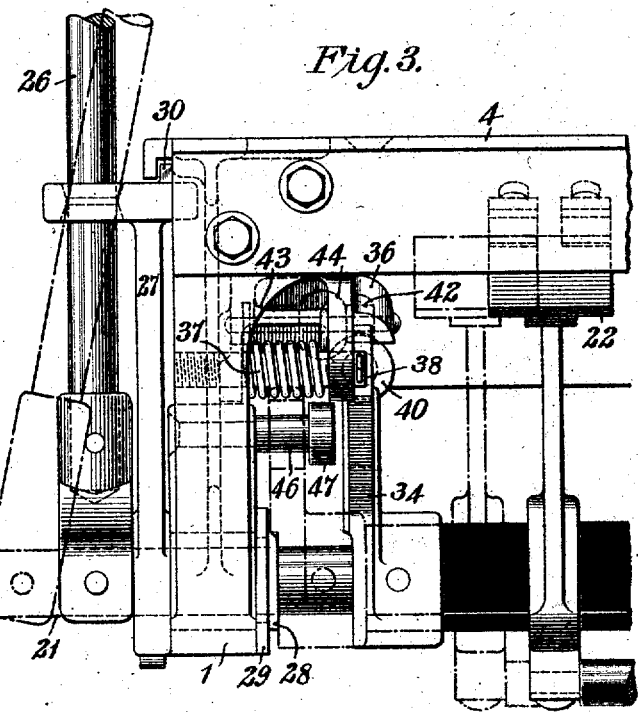
Figure 4:
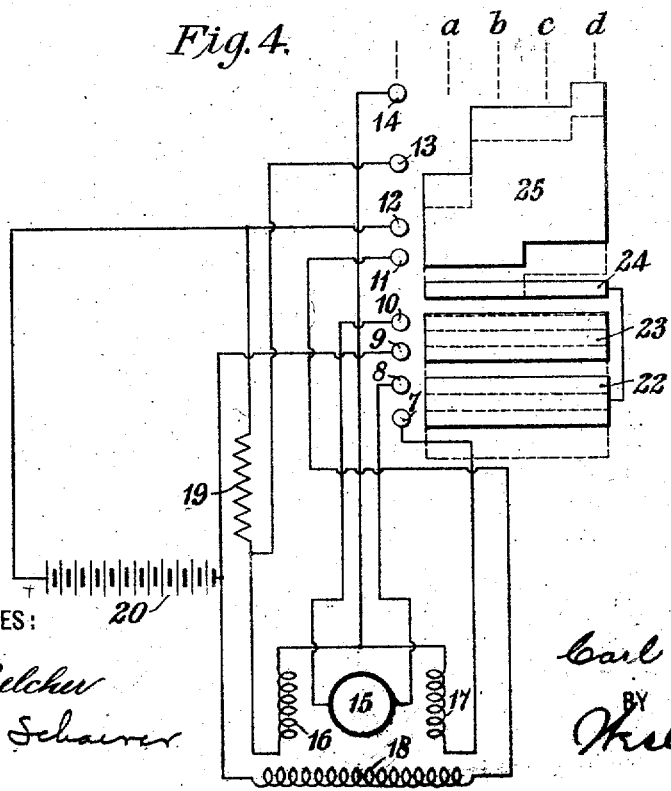

Figure 1 of the accompanying drawings is a plan view of a controller that embodies my invention. Fig. 2 is a view, in end elevation, of the controller. Fig. 3 is a view, in side elevation, of a portion of the controller. Fig. 4 is a diagrammatic view of the circuit connections thereof. Fig. 5 is a view, in side elevation, of a modification of the controller shown in the preceding figures, and Fig. 6 is a diagrammatic view of the circuit arrangements of the controller of Fig. 5.

The frame for the controller comprises substantially triangular shaped end pieces 1 and 2 that are connected by angle iron side pieces 3 and 4. Secured to the side piece 3 by means of a screw 5 is a wooden or other suitable block 6 upon which are mounted a plurality of resilient contact fingers 7, 8, 9, 10, 11, 12, 13 and 14 that are connected to armature 15 and field magnet windings 16, 17 and 18 of an electric motor, a resistance 19, and a source of energy, such as a battery 20, as indicated in Fig. 4. The lower corners of the end brackets 1 and 2 are provided with bearings for a shaft 21, mounted upon, but insulated from, which are a plurality of drum segments 22, 23, 24 and 25 that are adapted to be moved into and out of engagement with the stationary contact fingers 7 to 14, inclusive, by the rotation of the shaft. The shaft 21 is operated by means of a lever 26 that is pivotally attached at its lower end to one end of the shaft 21. The lever 26 projects through an opening in the outer end of an arm or bracket 27 having a cylindrical sleeve portion 28 that surrounds the shaft 21 and projects through the end bracket 1, the inner end being provided with a circumferential recess for the reception of a collar or washer 29 that prevents removal of the cylindrical portion 28 from the aperture in the end bracket. The arm 27 thus provides a fulcrum for the operating lever 26, such that the lever may effect longitudinal adjustment of the shaft 21, with the parts that are mounted thereon, as well as rotation thereof. The arm 27 rotates with the operating lever 26 and, in the initial or "off" position, a projection 30 upon the outer end thereof is located between two slightly rounded stops that are formed integral with the end bracket 1, the arm 27 being, in this manner, stiffened so that longitudinal adjustment of the shaft 21 may be effected without danger of breaking or displacing the same.

In order to accentuate the positions of the controller drum, a segment 34 is rigidly mounted upon the shaft 21 and is provided with notches $a'$, $b'$ and $c'$ in its periphery corresponding to the positions of the controller which effect the circuit connections for the various motor speeds utilized in normal operation and with an extension having an inwardly inclined face $d'$ corresponding to the position of the controller which effects the circuit connections for an emergency motor speed. A roller 35, that is carried at the free end of an arm 36, is maintained in engagement with the periphery of the segment 34 by means of a spring 37 that surrounds a stationary post 38 upon which the arm 36 is pivotally mounted, one end of the post 38 being screw-threaded into the end bracket 1. The notch corresponding to the initial or "off" position of the controller is provided by a roller 40 that is mounted upon a pin 41 with its axis parallel to the plane of the segment 34 and the peripheral surface of which is beveled inwardly from its ends. The roller 35 is provided with cylindrical surfaces 42 and 43 at its ends and with an intermediate enlarged and substantially spherical portion 44, the portion 42 being adapted to engage the periphery of the segment 34 when the controller occupies the position indicated in the drawings, and the surface 43 being adapted to engage the segment 34 when the controller drum is moved longitudinally to the position indicated by broken lines in Fig. 3. The enlarged portion 44 of the roller 35 coöperates with the roller 40 to accentuate the two operating longitudinal positions of the controller, and to prevent it from occupying an intermediate position. The segment 34 is provided with a slot at 45 the sides of which are substantially concentric with the shaft 21, the width of the slot being but slightly larger than the diameter of a pin 46, that projects from the end bracket 1 of the controller, but less than the diameter of a head 47 upon the free end of the pin. The slot is enlarged at a location corresponding to the initial or "off" position of the controller to a diameter slightly greater than the diameter of the head 47 of the pin 46, so that only when the controller occupies its initial or "off" position will the longitudinal adjustment of the shaft and the drum be possible.

In the operation of the controller, the operating lever 26 will be moved from its initial or "off" position, as indicated in full lines in Fig. 2, toward the left for both forward and backward operation of the vehicle upon which it may be mounted, though, for forward operation, it will be moved in a plane substantially normal to the shaft 21, as indicated by the full line position in Fig. 3, and, for backward operation, it will be moved in a plane disposed at an angle to the normal plane, as indicated by the broken line position in Fig. 3. That is, for forward operation, the segments 22 to 25, inclusive, will be simply rotated from the positions indicated in the full lines in the drawings into engagement with the corresponding contact fingers, while, for backward operation, they will be first adjusted longitudinally and will then be moved into engagement with the stationary contact fingers, different circuit connections and relations being thereby caused to exist.

The circuit connections that are established for each position of the controller may be readily understood by referring to Fig. 4. For forward operation, the controller segments 22 to 25, inclusive, will be moved from left to right until they are engaged by the corresponding stationary contact fingers along the position-indicating line $a$ and the member 42 engages the notch $a'$. A circuit is then established from the positive terminal of the battery 20, by way of parts bearing reference characters 12, 25, 11 and 18, and another circuit is established from the battery, by way of parts bearing reference characters 19, 16, 17, 7, 22, 8, 15, 10, 23 and 9. Thus, the field magnet windings 16 and 17 are connected in series with the armature 15 and resistance 19 is included in this circuit, and the shunt field magnet winding 18 is supplied through a separate circuit. Movement of the controller to the position $b$ causes the member 42 to engage the notch $b'$ and the segment 25 to engage contact finger 13, the resistance 19 being thereby shunted. Movement of the controller to the position $c$ effects engagement of the member 42 and the notch $c'$ and disengagement of the parts 12 and 11, the circuit of the shunt winding 18 being thereby interrupted. In position $d$, which is the emergency position of the controller, the member 42 engages the inwardly inclined face $d'$ and the segment 25 engages contact finger 14, the portion 16 of the series field winding being thereby shunted.

By reason of the inward inclination of the face $d'$ and the spring pressure exerted upon the member 42, the latter will return to the notch $c'$ if the lever 26 is released. It follows, therefore, that the motor or motors will be operated at the emergency speed only so long as the lever 26 is manually retained in its emergency position. It would, of course, be possible to apply a supplemental force in order to insure an automatic return of the controller from position $d$ to position $c$, if such additional force were found desirable.

For backward operation, the drum segments are first moved longitudinally to the positions indicated by the broken lines in Fig. 4, and the controller is then rotated until the segments engage the corresponding contact fingers along the position-indicating lines. In position a, a circuit is established from the battery 20, by way of parts bearing reference numerals 12, 25, 11 and 18, back to the battery, as for forward operation, and another circuit is established from the battery, by way of parts bearing reference numerals 19, 16, 17, 7, 22, 24, 10, 15, 8, 23 and 9, it being observed that the direction of current flow in the armature 15 is reversed. As the controller is moved to the position b, the segment 25 engages contact fingers 13 and the resistance 19 is removed from the circuit. Further rotation of the controller, however, effects no additional changes in the circuits, so that, for backward operation, only two comparatively slow speeds are obtainable.

The lower end of the arm or bracket 27 is provided with an extension 49 having an eye at its outer end whereby it may be connected to a chain or cable for actuating brakes for the vehicle, the brakes being set when the lever 26 is moved in a clockwise direction to or toward the broken line position indicated at 50. If desired, electrical braking may also be effected by movement of the controller handle in a clockwise direction, if the drum is provided, in a well understood manner, with segments engaged by the contact fingers to so connect the motors as to convert them into braking generators.

It will be understood, from the foregoing description, that if the controller lever is moved beyond its "off" position in returning it to that position, the only result is to apply the brakes, and, consequently, no serious damage can occur.

When the controller is employed for the purpose of governing two or more motors, it may be desirable to effect longitudinal adjustment of only the portion of the drum that is employed for causing reversal of the connections and direction of rotation of the motors. A structure adapted for such operation is shown in Figs. 5 and 6, in which the main shaft of the controller is divided into two sections 51 and 52, that are joined at 32 by a slot and tongue connection, and upon the section 51 are mounted drum segments 53, 54, 55, 56, 57 and 58 that coöperate with contact fingers 59, 60, 61, 62, 63, 64, 65 and 66 to govern the direction of rotation of the motors, while the section 52 is provided with drum segments 67, 68, 69, 70 and 71 that coöperate with contact fingers 72, 73, 74, 75, 76, 77, 78, 79, 80 and 81 to effect speed control of the motors. The circuit connections may be best understood by referring to Fig. 6 in which two motors, having armatures 82 and 83 and field magnet windings 84, 85, 86 and 87, and a battery or other suitable source 88 are connected in the proper manner to the contact fingers of the controller. When the controller occupies the position e, a circuit is established from one terminal of the battery 88, by way of devices bearing reference numerals 73, 67, 74, 84, 76, 69, 75, 85, 59, 53, 60, 82, 62, 61, 63, 56, 64, 83, 66, 57, 65, 87, 79, 71, 80 and 86, to the other terminal of the battery. Thus the armature and field magnet windings of the motors are all connected in series relation. In position f of the controller, two circuits are established, one from one terminal of the battery 88, by way of the devices bearing reference numerals 73, 67, 72, 61, 54, 62, 82, 60, 53, 59, 85, 75, 69, 76, 84, 74, 68, 70 and 78, to the other terminal of the battery. The other circuit that is established is by way of devices bearing reference numerals 88, 73, 67, 72, 63, 56, 64, 83, 66, 57, 65, 87, 79, 71, 80 and 86. The motors are then connected in parallel relation with the two sections of the field magnet winding of each motor, in series relation. When the controller occupies position g, the two sections of the field magnet winding of each motor are connected in parallel relation, but since the mode of effecting speed control forms no part of the present invention, it is not deemed necessary to describe the circuits in detail.

When it is desired to cause reversal of the direction of rotation of the motors, the segments 53 to 58, inclusive, will be moved to the broken line positions of Fig. 6. Then, when the controller occupies the position e, a circuit is established by way of the devices bearing reference numerals 88, 73, 67, 74, 84, 76, 69, 75, 85, 59, 53, 55, 62, 82, 60, 54, 61, 63, 56, 58, 66, 83, 64, 57, 65, 87, 79, 71, 80 and 86. It will be observed that the direction of current flow in the armatures 82 and 83 is reversed with respect to the direction of flow in the field magnet windings, as compared with the direction of current flow before the segments 53 to 58 were moved longitudinally.

I claim as my invention:

1. A controller comprising coöperating relatively rotatable members one of which is axially adjustable to cause the members to coöperate in different relations, and a single lever for effecting such adjustment and also rotation of the rotatable member.

2. A controller comprising coöperating switch members, one of which is both rotatable and axially adjustable to cause variations in the circuit arrangements, and a single lever for effecting both adjustments.

3. The combination with an electric motor, of a controller comprising coöperating switch members one of which is rotatable to effect speed variation and is axially adjustable to govern the direction of rotation of the motor.

4. The combination with an electric motor, of a controller comprising contact circuit terminals, a rotatable and longitudinally adjustable member and an operating lever that rotates said member in one direction to effect variation of motor speed and in the opposite direction to effect braking, and adjusts it longitudinally to govern the direction of motor rotation.

5. The combination with an electric motor, of a controller comprising a switch member that is axially adjustable to govern the direction of rotation of the motor and is rotatable in one direction only from its initial position to effect speed variation.

6. The combination with an electric motor, of a controller comprising a switch member that is axially adjustable to govern the direction of rotation of the motor and is rotatable in one direction only from its initial position to effect speed variation, and means for preventing axial movement of the member except when it occupies its initial position.

7. A controller comprising coöperating relatively rotatable switch members one of which is axially adjustable to cause variations in the circuit arrangements, and means for preventing axial adjustment of the member except when the controller occupies its initial position.

8. The combination with an electric motor, of a controller comprising coöperating switch members one of which is rotatable and axially adjustable and is provided with a set of segments for governing the speed of rotation of the motor, and another set for governing the direction of rotation of the motor.

9. A controller comprising two sets of contact fingers, a drum having segments to coöperate with said fingers, and a single lever which serves to turn said drum on its axis and to adjust it longitudinally.

10. A controller comprising coöperating switch members one of which is movable in two paths, and position-indicating means for each path.

11. A position-indicating device comprising a rotatable and axially movable cam segment having peripheral notches, a grooved roller carried thereby and forming one of the notches, and a resiliently actuated roller having end portions the one or the other of which normally engages the periphery of the cam segment, and an enlarged intermediate portion.

12. A position-indicating device comprising a rotatable and axially movable cam segment having peripheral notches and an annular slot, a grooved roller carried thereby and forming one of the notches, a resiliently actuated roller having an enlarged middle portion and end portions, the one or the other of which normally engages the periphery of the cam segment, and a stationary pin that may be inserted into or removed from the annular slot in the segment only when the rollers are in engagement.

13. A controller for electric motors having an operating lever, means for retaining said lever in any one of a plurality of speed-governing positions to which it may be moved, and means for returning the lever from the emergency speed position to the maximum normal speed position, when released.

14. In a controller for electric motors, an operating lever having a segment provided with a plurality of peripheral notches corresponding to normal motor speed positions, and an inwardly inclined face contiguous to the notch corresponding to the highest normal motor speed, and a spring-actuated arm having a roller to engage said notches and said inwardly inclined face.

In testimony whereof, I have hereunto subscribed my name this 29th day of December, 1906.

CARL E. BEDELL.

Witnesses:
 WILLIAM COOPER,
 BIRNEY HINES.